United States Patent
Chen et al.

(10) Patent No.: US 8,979,377 B2
(45) Date of Patent: Mar. 17, 2015

(54) BEARING DEVICE, METHOD OF MANUFACTURING BEARING DEVICE AND BEARING ASSEMBLY HAVING THE BEARING DEVICE

(71) Applicant: Foxconn Technology Co., Ltd., New Taipei (TW)

(72) Inventors: Wen-Cheng Chen, New Taipei (TW); Ming-Hsiu Chung, New Taipei (TW)

(73) Assignee: Foxconn Technology Co., Ltd., New Taipei (TW)

( * ) Notice: Subject to any disclaimer, the term of this patent is extended or adjusted under 35 U.S.C. 154(b) by 133 days.

(21) Appl. No.: 13/719,258

(22) Filed: Dec. 19, 2012

(65) Prior Publication Data
US 2013/0251292 A1     Sep. 26, 2013

(30) Foreign Application Priority Data
Mar. 23, 2012   (TW) .................................. 101110000

(51) Int. Cl.
| F16C 17/10 | (2006.01) |
| F16C 32/06 | (2006.01) |
| F16C 33/00 | (2006.01) |
| F16C 33/10 | (2006.01) |
| F16C 33/12 | (2006.01) |
| F16C 33/14 | (2006.01) |

(52) U.S. Cl.
CPC ............. *F16C 32/0681* (2013.01); *F16C 33/00* (2013.01); *F16C 33/103* (2013.01); *F16C 33/1085* (2013.01); *F16C 33/128* (2013.01); *F16C 33/145* (2013.01); *F16C 2220/20* (2013.01); *F16C 2370/12* (2013.01); *F16C 2360/46* (2013.01); *F16C 2226/30* (2013.01); *F16C 2220/04* (2013.01); *F16C 17/10* (2013.01)
USPC .......................................................... 384/279

(58) Field of Classification Search
USPC ......... 384/107, 114, 241, 287, 289, 322, 371, 384/386, 397–399, 415; 417/423.13
See application file for complete search history.

(56) References Cited

U.S. PATENT DOCUMENTS

| 3,503,660 | A | * | 3/1970 | Mori ............................. 384/400 |
| 3,583,778 | A | * | 6/1971 | Mori ............................. 384/371 |
| 6,554,478 | B2 | * | 4/2003 | Hsieh ............................ 384/130 |
| 2007/0286538 | A1 | * | 12/2007 | Mizutani ....................... 384/112 |
| 2009/0279819 | A1 | * | 11/2009 | Hori et al. ..................... 384/124 |

* cited by examiner

*Primary Examiner* — Thomas Diaz
(74) *Attorney, Agent, or Firm* — Novak Druce Connolly Bove + Quigg LLP

(57) ABSTRACT

A bearing device includes a body, a circular cover, and a through hole commonly defined through both the body and the cover. The body is an injection molded piece made from metal powder and molten binder. The cover is an injection molded piece made from metal powder and molten binder. Two passages are defined between the body and the cover, and each passage communicates the through hole with an exterior of the bearing device, whereby lubricant can flow from the through hole to the passages. A bearing assembly having the bearing device is also provided, and a method of manufacturing the bearing device is further provided.

16 Claims, 6 Drawing Sheets

BEARING DEVICE, METHOD OF MANUFACTURING BEARING DEVICE AND BEARING ASSEMBLY HAVING THE BEARING DEVICE

BACKGROUND

1. Technical Field

The disclosure relates to a bearing device having good lubricant retention, a method of manufacturing the bearing device, and a bearing assembly having the bearing device.

2. Description of the Related Art

At present, bearings are widely used in spindle motors that are employed in various electronic devices, such as compact disc (CD) drives, digital video disc (DVD) drives, hard disk drives, laser beam printers, floppy disk drives, and heat-dissipation fans. These spindle motors require bearings with a small size, a high rotational accuracy, and a long working lifetime.

A typical hydrodynamic bearing defines a bearing hole therein. A shaft is rotatably received in the bearing hole. Lubricant is often used between an inner circumferential surface of the bearing and an external circumferential surface of the shaft to reduce abrasion of the bearing and the shaft. There are three common types of hydrodynamic bearings; namely, a ball bearing, a fluid bearing, and a sleeve bearing. The structures of the ball bearing and the fluid bearing are complex, and so the cost of manufacturing the ball bearing and the fluid bearing is high. The structure of a common sleeve bearing is simple. However, when the sleeve bearing is manufactured using a molding process, the quality of the sleeve bearing is not very high. In particular, material interstices in the bearing are typically not small enough. As a result, friction between the lubricant and the bearing and friction between the lubricant and the shaft is large when the lubricant flows between the bearing and the shaft. Thus, an operating life of the bearing is not long.

Therefore it is desirable to provide a bearing device, a method of manufacturing the bearing device, and a bearing assembly to solve or at least mitigate the above-described problems.

BRIEF DESCRIPTION OF THE DRAWINGS

The components of the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
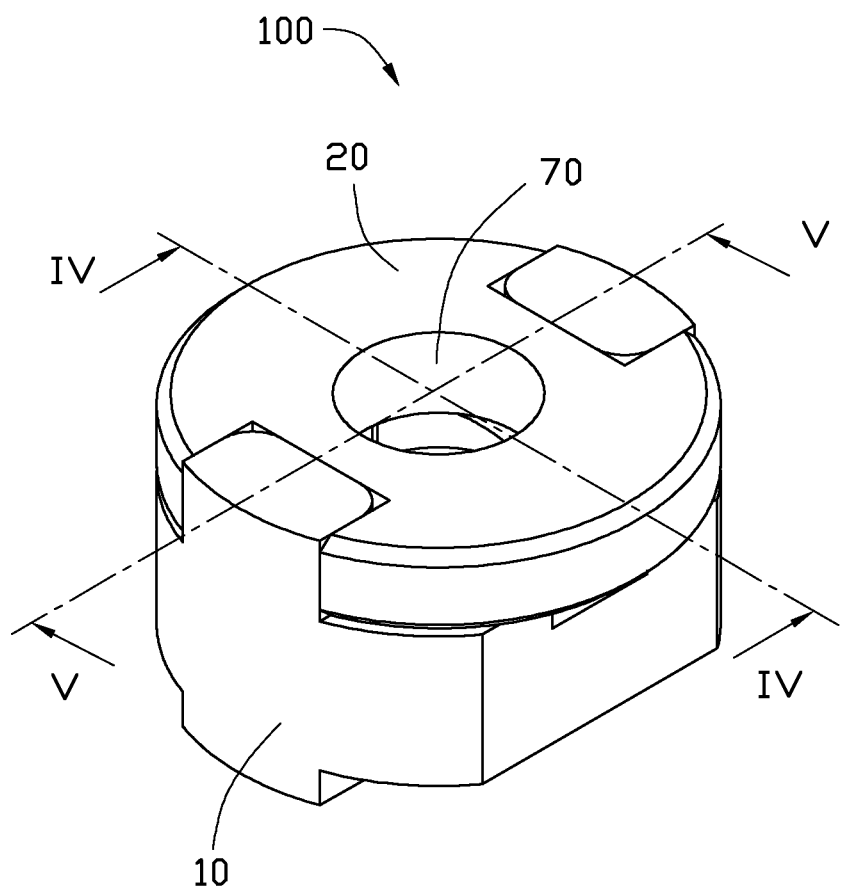
FIG. 1 is an isometric, assembled view of a bearing device, according to an exemplary embodiment of the present disclosure.
Figure 4:
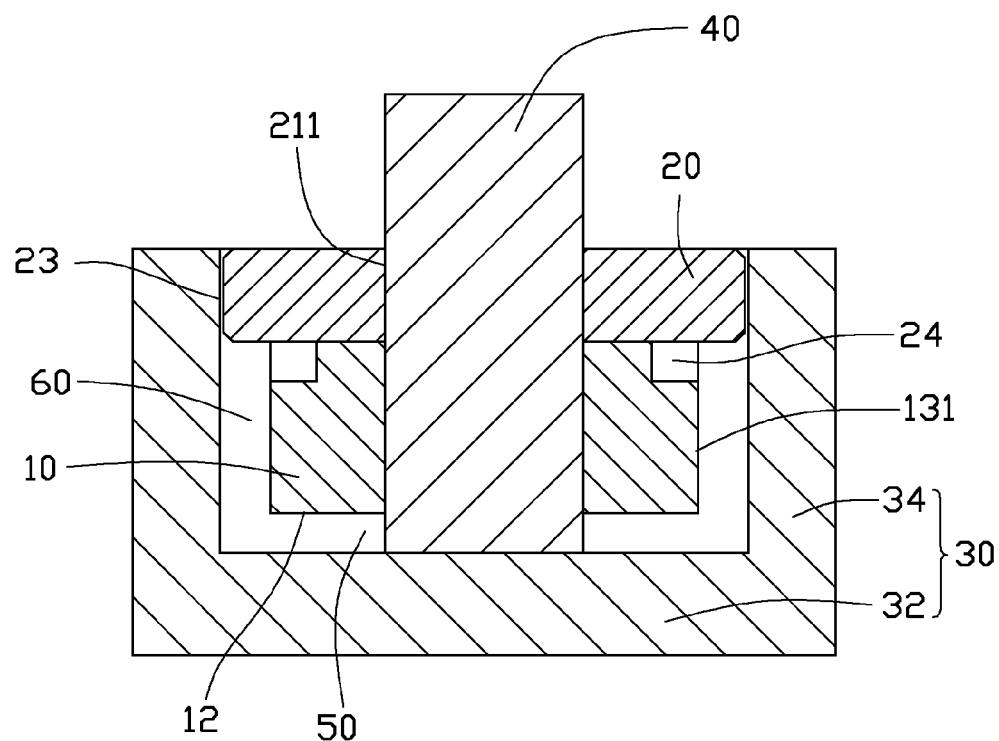
FIG. 4 is a cross-sectional view of the bearing device of FIG. 1, taken along line IV-IV thereof.

Referring to FIGS. 1 and 4, a bearing assembly in accordance with an embodiment of the disclosure is shown. The bearing assembly includes a bearing 100, a bushing 30, and a shaft 40. The bearing 100 is received in the bushing 30. The shaft 40 is rotatably mounted in the bearing 100. Lubricant is filled between the shaft 40, the bushing 30 and the bearing 100.

The bearing 100 is made from metal powder and molten binder, and formed by an injection molding process. The bearing 100 includes a body 10, and a cover 20 mounted on the body 10.

Figure 2:
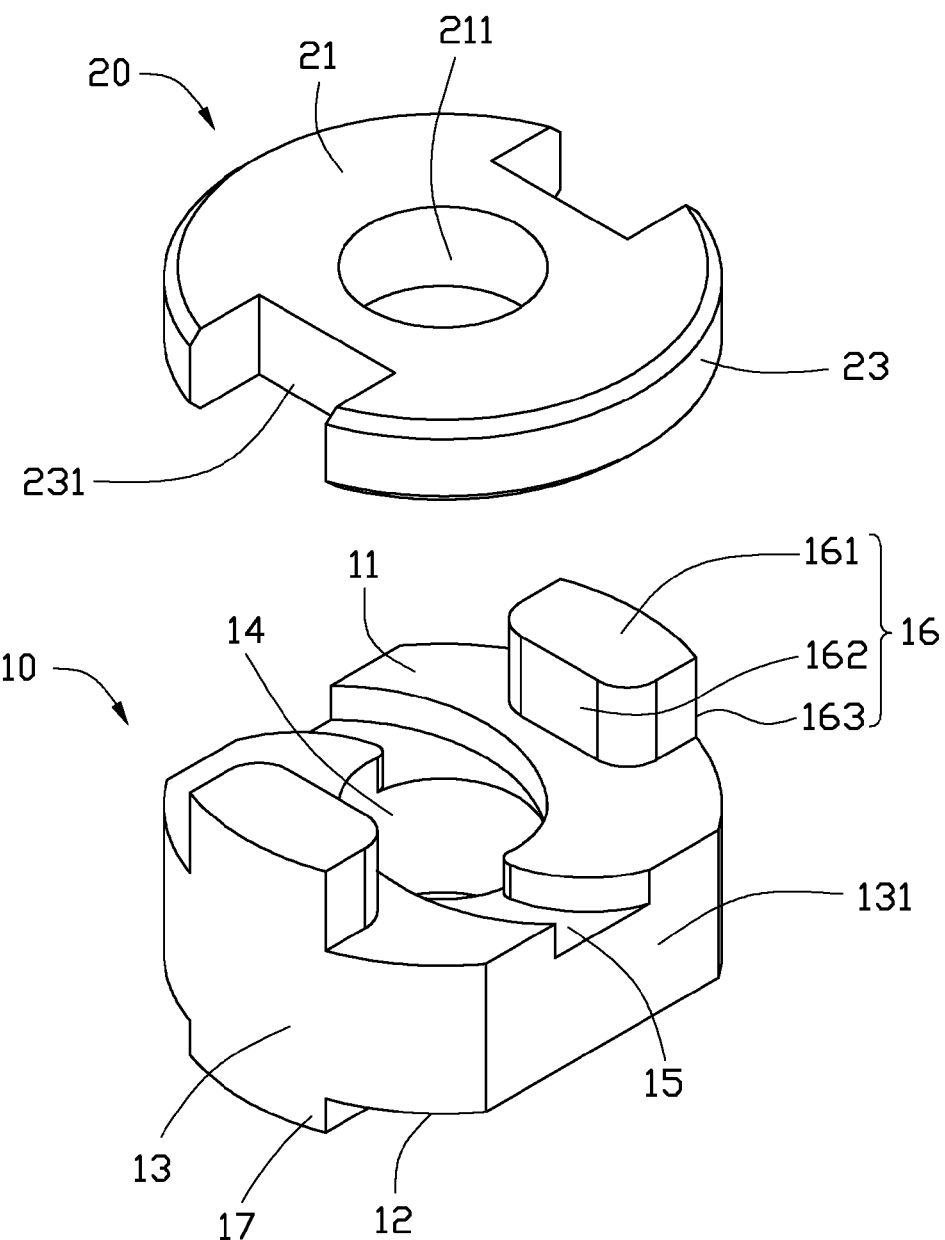
FIG. 2 is an exploded view of the bearing device of FIG. 1.
Figure 3:
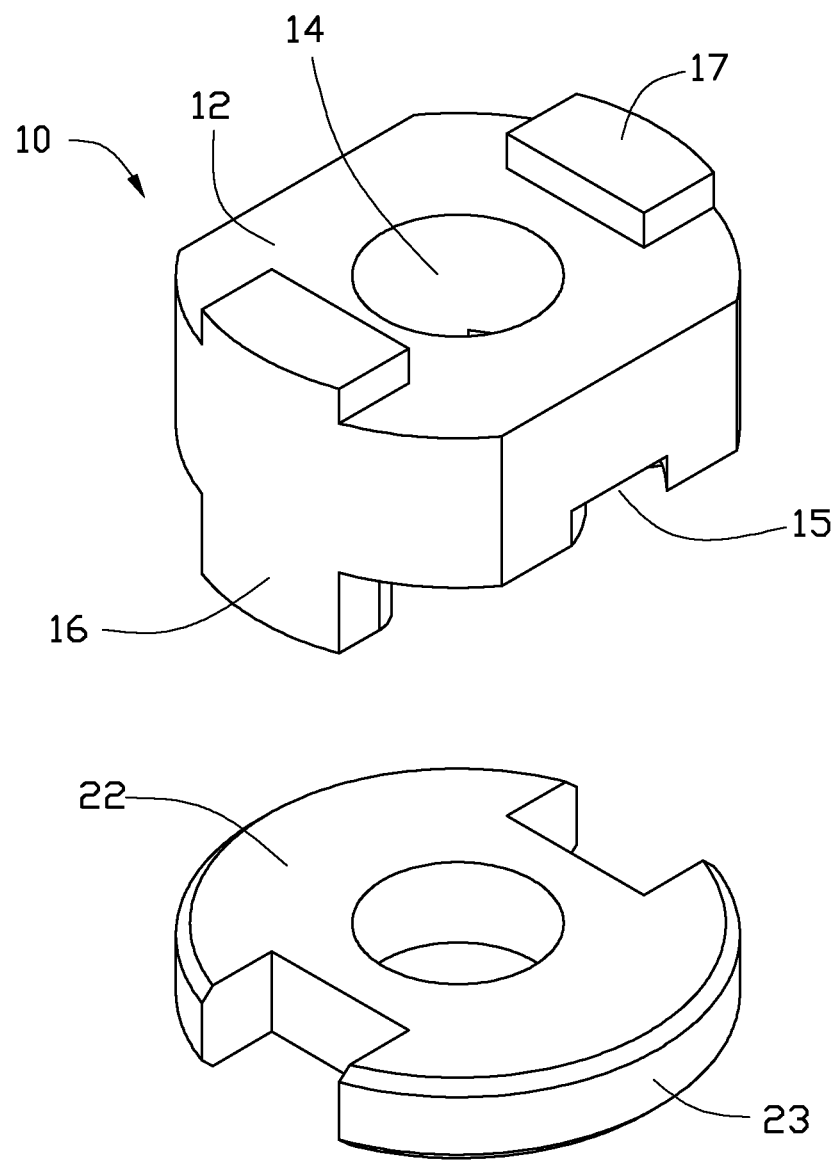
FIG. 3 is an inverted view of the bearing device of FIG. 2.

Referring also to FIGS. 2 and 3, the body 10 is generally in the form of a circular cylinder. The body 10 includes a upper surface 11 and a lower surface 12 at opposite sides thereof, and a side wall 13 interconnecting the upper surface 11 and the lower surface 12. The upper surface 11 is used for supporting the cover 20 when the cover 20 is attached to the body 10. Two flat surfaces 131 are formed in the side wall 13. The two flat surfaces 131 are parallel to each other and extend vertically from the upper surface 11 to the lower surface 12. The flat surfaces 131 can be formed by cutting. A distance between the two flat surfaces 131 is smaller than a diameter of the body 10. An axial hole 14 is defined in a center of the body 10, extending from the upper surface 11 to the lower surface 12. The axial hole 14 is used for receiving the shaft 40. Two recesses 15 are defined in the upper surface 11. The two recesses 15 are curved as viewed from a top of the body 10, and each recess 15 extends like part of a spiral from the axial hole 14 to a respective one of the two flat surfaces 131. The directions of curvature of the two recesses 15 can be considered to be counterclockwise, as viewed from the top of the body 10. The two recesses 15 are radially symmetrical about the axial hole 14, and can be considered to be vortically arranged. The vortical arrangement can be considered to be a counterclockwise vortical arrangement. The two recesses 15 communicate the axial hole 14 with an exterior of the body 10 at the flat surfaces 131.

Two first posts 16 are formed on the upper surface 11, between the two flat surfaces 131. In other words, an imaginary central plane between the two first posts 16 is orthogonal to an imaginary central plane between the two flat surfaces 131, wherein both imaginary central planes pass through an axis of the axial hole 14. Each first post 16 includes a top surface 161, and a plurality of inner surfaces 162 and a curved outer surface 163 both extending down from the top surface 161. The outer surface 163 smoothly connects to the corresponding side wall 13 of the body 10. That is, a radius of the outer surface 163 is substantially the same as that of the side wall 13 of the body 10. Two second posts 17 are formed on the lower surface 12. The positions of the second posts 17 correspond to those of the first posts 16. A shape of each second post 17 is similar to that of each first post 16. In particular, an outer surface (not labeled) of each second post 17 smoothly connects to the corresponding side wall 13 of the body 10, with a radius of the outer surface substantially the same as that of the side wall 13 of the body 10.

The cover 20 is generally in the form of a circular plate, and has a thickness substantially the same as a common height of the first posts 16 of the body 10. The cover 20 includes a top circular wall 21, a bottom circular wall 22, and an annular wall 23 extending perpendicularly between peripheries of the top circular wall 21 and the bottom circular wall 22. A central hole 211 is defined in a center of the cover 20, and extends through both the top and bottom circular walls 21, 22. A central axis of the central hole 211 is collinear with that of the axial hole 14 of the body 10. The central hole 211 of the cover 20 and the axial hole 14 of the body 10 are thus aligned with each other. A diameter of the central hole 211 is substantially the same as that of the axial hole 14, and thus the central hole 211 and the axial hole 14 cooperatively constitute a central axial hole 70 of the bearing device 100. The bottom circular wall 22 is flat and used for attaching to the upper surface 11 of the body 10. Two openings 231 are defined in opposite sides of the annular wall 23. The two openings 231 correspond to the two first posts 16, respectively.

When the cover 20 is assembled to the body 10, the upper surface 11 of the body 10 is attached to the bottom circular wall 22 of the cover 20. The two first posts 16 are clipped in the two openings 231 of the cover 20, respectively. In this embodiment, the body 10 and the cover 20 are connected by sintering. The two recesses 15 of the body 10 are covered by the cover 20 to form two passages 24 between the cover 20 and the body 10. The passages 24 communicate the axial hole 14 with the exterior of the body 10 at the flat surfaces 131. The passages 24 can lead lubricant filled in the bearing device 100 to flow from the axial hole 14 to the flat surfaces 131. The top surface 161 of each first post 16 is coplanar with a top surface of the top circular wall 21.

Figure 5:
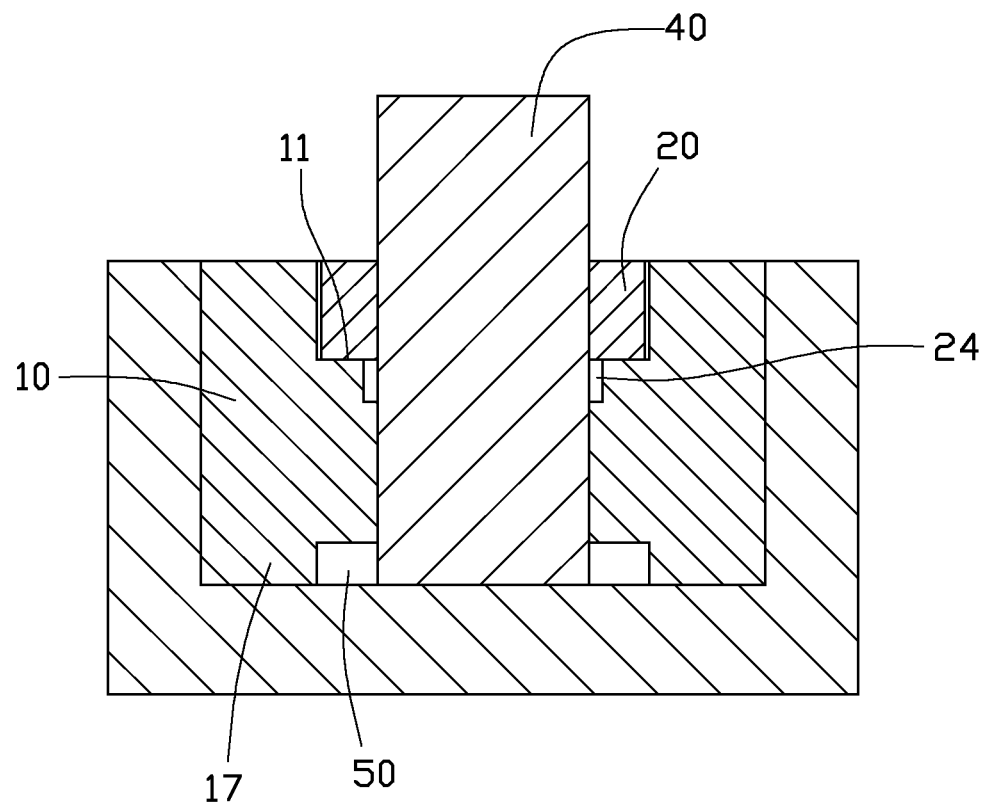
FIG. 5 is a cross-sectional view of the bearing device of FIG. 1, taken along line V-V thereof.

Referring to FIGS. 4 and 5, when in use, the bearing device 100 is received in the bushing 30. The shaft 40 is received in the bearing device 100. The shaft 40 penetrates through the axial hole 14 of the body 10 and the central hole 211 of the top circular wall 21. The bearing device 100, the bushing 30 and the shaft 40 are thus combined to construct the bearing assembly. The bushing 30 includes a bottom plate 32, and a sleeve 34 extending up from a periphery of the bottom plate 32. An inner diameter of the sleeve 34 is slightly larger than an outer diameter of the cover 20, such that when the cover 20 is received in the sleeve 34, small gaps remain therebetween. The second posts 17 at the bottom of the body 10 abut the bottom plate 32. The second posts 17 separate the bottom plate 32 of the bushing 30 from the lower surface 12 of the bearing 10. The bottom plate 32 of the bushing 30 and the lower surface 12 of the bearing 10 together define a first storing room 50. The side walls 13 of the body 10 are attached to an inner surface of the sleeve 34, with the flat surfaces 131 spaced from the inner surface of the sleeve 34. Each flat surface 131 of the body 10, the inner surface of the sleeve 34 and the bottom wall 22 of the cover 20 together define a second storing room 60. Thus there are two second storing rooms 60. The first storing room 50 is communicated with the second storing rooms 60. Each second storing room 60 is communicated with the corresponding adjacent passage 24. Lubricant is filled in the first storing room 50, the second storing rooms 60, and the gaps between the body 10 and the shaft 40.

During rotation of the shaft 40, the lubricant is driven to flow from the first storing room 50 upwardly to the gaps between the body 10 and the shaft 40. Accordingly, a fluid dynamic pressure is generated in the gaps between the body 10 and the shaft 40 to prevent the shaft 40 from directly contacting the body 10. Part of the lubricant flows out from each passage 24 to the corresponding second storing room 60, and then returns to the first storing room 50 directly, along a circulatory loop. A circumfluence of the lubricant flowing through the first storing room 50, the gaps between the body 10 and the shaft 40, the passages 24, the second storing rooms 60 and the first storing room 50 in sequence, prevents the lubricant from flowing to a top of the bearing device 100 and leaking out of the bearing device 100.

A pressure of the lubricant applied to the body 10 and the shaft 40 near the upper surface 11 is smaller than that at other positions between the body 10 and the shaft 40. Thus, the lubricant is easily expelled via the passages 24 at the upper surface 11, thereby preventing or avoiding the lubricant from flowing upwardly to the cover 20 and then out of the cover 20 via the central hole 211. Furthermore, the lubricant flows out via the passages 24 easily because the passages 24 are vortically arranged in a rotating direction of the shaft 40. That is, the counterclockwise vortical arrangement of the passages 24 is compatible with a counterclockwise rotation of the shaft 40.

Figure 6:
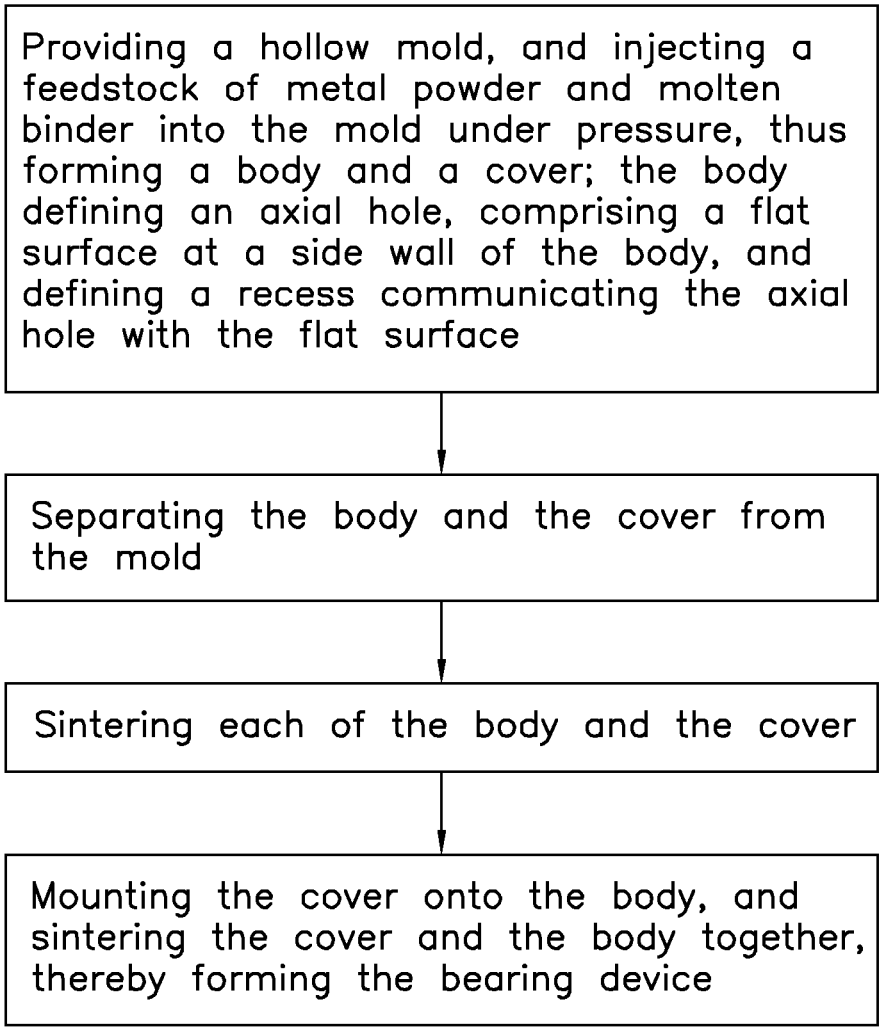
FIG. 6 is a flow chart of a method of manufacturing the bearing device of FIG. 1 in accordance with an exemplary embodiment of the present disclosure.

Referring to FIG. 6, an exemplary method of manufacturing the bearing device 100 includes the following steps:

step 1: providing a hollow mold (not shown), and then injecting a feedstock of metal powder and molten binder into the mold under pressure, thus forming a body 10 and a cover 20. The body 10 defines an axial hole 14, two flat surfaces 131 at a side wall 13 thereof, and two recesses 15 communicating the axial hole 14 and the two flat surfaces 131, respectively.

step 2: separating the body 10 and the cover 20 from the mold.

step 3: sintering each of the body 10 and the cover 20.

step 4: mounting the cover 20 on the body 10, and sintering the cover 20 and the body 10 together, thereby forming the bearing device 100.

In step 1, the molten binder of the feedstock is required to be easily removable by debinding or extraction. Because the bearing device 100 is made from metal powder and molten binder by an injection molding process, material interstices in the bearing device 100 are small enough to reduce friction between the lubricant and the bearing device 100 and between the lubricant and the shaft 40. Therefore the bearing device 100 undergoes minimal wear and tear, and can have an extended operating life. The body 10 and the cover 20 are manufacturing individually, which makes the manufacturing process simple. The body 10 and the cover 20 are sintered together, which makes a coaxial alignment of the axial hole 14 of the body 10 and the central hole 211 of the cover 20 more accurate compared to that of a bearing device made by other manufacturing methods.

The bearing device 100 is configured (i.e., structured and arranged) for mass-production by the method in accordance with the above-described exemplary embodiment. Also, the bearing device 100 manufactured by the present exemplary method has good lubricant retention.

It is to be further understood that even though numerous characteristics and advantages have been set forth in the foregoing description of the embodiments, together with details of the structures and functions of the embodiments, the disclosure is illustrative only; and that changes may be made in detail, especially in the matters of shape, size, and arrangement of parts within the principles of the disclosure to the full extent indicated by the broad general meaning of the terms in which the appended claims are expressed.

What is claimed is:

1. A bearing device, comprising:
a body having a upper surface, a lower surface, and a side wall interconnecting the upper surface and the lower surface, the body being an injection molded piece made from metal powder and molten binder; and
a generally circular cover attached on the body, the cover having a top generally circular wall, a bottom generally circular wall and a generally annular wall interconnecting the top wall and the bottom wall, and the cover being an injection molded piece made from metal powder and molten binder;
wherein a through hole is commonly defined through both the body and the cover, two passages are defined between the body and the cover, and each passage communicates the through hole with a lateral exterior of the bearing device, whereby lubricant can flow from the through hole to the passages;

wherein a first post if formed on the upper surface of the body, an opening is defined in the cover, and the first post is clipped in the opening; wherein each passage extends from the through hole to the side surface of the body in a counterclockwise vortical arrangement.

2. The bearing device of claim 1, wherein the body and the cover are a sintered-together combination.

3. The bearing device of claim 1, wherein an axial hole is defined in the body, a central hole is defined in the cover, and the axial hole and the central hole are aligned with each other and cooperatively constitute the through hole.

4. The bearing device of claim 3, wherein a pair of flat surfaces is formed in the side wall, each flat surface extends vertically from the upper surface to the lower surface, and the bottom generally circular wall of the cover is attached to the upper surface of the body.

5. The bearing device of claim 4, wherein a periphery of the annular wall of the cover protrudes beyond the flat surfaces of the body, and the passages communicate the through hole with lateral exteriors of the body at the flat surfaces.

6. The bearing device of claim 4, wherein a pair of recesses is defined in the upper surface of the body, and the recesses are covered by the cover, thereby forming the passages between the body and the cover.

7. The bearing device of claim 6, wherein each recess extends like part of a spiral from the axial hole to a respective one of the two flat surfaces.

8. The bearing device of claim 4, wherein each passage extends from the through hole to the flat surface of the body in a counterclockwise vortical arrangement.

9. The bearing device of claim 4, wherein a second post is formed on the lower surface of the body, and is positioned corresponding to the first post.

10. A bearing assembly, comprising:
a bearing device, comprising:
a body having a side wall, the body being an injection molded piece made from metal powder and molten binder; and
a generally circular cover having an annular wall, the cover attached on the body, and the cover being an injection molded piece made from metal powder and molten binder;
wherein a through hole is commonly defined through both the body and the cover, a passage is defined between the body and the cover, and the passage communicates the through hole with a lateral exterior of the bearing device;
a bushing comprising a bottom plate and a sleeve extending from a periphery of the bottom plate, the bearing device received in the bushing;
a shaft rotatably received in the through hole of the bearing device; and
lubricant retained between the shaft and the body, at least part of the lubricant flowable out into the passage and thence to the lateral exterior of the bearing device in the bushing;
wherein a first post is formed on the upper surface of the body, an opening is defined in the cover, and the first post is clipped in the opening; wherein the passage extends from the through hole to the side surface of the body in a counterclockwise vortical arrangement.

11. The bearing assembly of claim 10, wherein the body and the cover are a sintered-together combination.

12. The bearing assembly of claim 10, wherein a flat surface is formed in the side wall and extends vertically from the upper surface to the lower surface, and a bottom generally circular wall of the cover is attached to the upper surface of the body.

13. The bearing assembly of claim 12, wherein a periphery of the annular wall of the cover protrudes beyond the flat surface of the body, and the passage communicates the through hole with a lateral exterior of the body at the flat surface.

14. The bearing assembly of claim 10, wherein a post is formed on the lower surface of the body, the post abuts the bottom plate of the bushing, and a first storing room for storing lubricant is defined between the lower surface of the body and the bottom plate of the bushing.

15. The bearing assembly of claim 14, wherein a second storing room for storing lubricant is defined between an inner surface of the sleeve and the flat surface of the body of the bearing device.

16. The bearing assembly of claim 15, wherein lubricant in the first storing room is driven to flow from the first storing room upwardly to gaps between the shaft and the body, and at least part of the lubricant between the shaft and the body is driven to flow out into the passage and thence to the second storing room, and then returns to the first storing room.

\* \* \* \* \*